United States Patent
Ohta et al.

(10) Patent No.: US 9,002,519 B2
(45) Date of Patent: Apr. 7, 2015

(54) ROBOT CONTROL METHOD, ROBOT CONTROL DEVICE, AND ROBOT CONTROL SYSTEM

(71) Applicant: JTEKT Corporation, Osaka-shi (JP)

(72) Inventors: Hiromichi Ohta, Kariya (JP); Yasuharu Mukai, Kariya (JP); Kazuya Numazaki, Chiryu (JP)

(73) Assignee: JTEKT Corporation, Osaka-shi (JP)

( * ) Notice: Subject to any disclaimer, the term of this patent is extended or adjusted under 35 U.S.C. 154(b) by 129 days.

(21) Appl. No.: 13/795,967

(22) Filed: Mar. 12, 2013

(65) Prior Publication Data

US 2013/0245829 A1   Sep. 19, 2013

(30) Foreign Application Priority Data

Mar. 15, 2012  (JP) ................. 2012-059137

(51) Int. Cl.
*G05B 19/00* (2006.01)
*B25J 9/16* (2006.01)

(52) U.S. Cl.
CPC .............. *B25J 9/1628* (2013.01); *Y10S 901/09* (2013.01); *B25J 9/1633* (2013.01); *B25J 9/1643* (2013.01); *G05B 2219/40367* (2013.01)

(58) Field of Classification Search
CPC ...... B25J 9/1633; B25J 9/1635; B25J 9/1638; B25J 9/1641
See application file for complete search history.

(56) References Cited

U.S. PATENT DOCUMENTS

| | | | |
|---|---|---|---|
| 5,341,459 A * | 8/1994 | Backes | 700/260 |
| 5,587,635 A * | 12/1996 | Watanabe et al. | 318/434 |
| 2009/0287354 A1* | 11/2009 | Choi | 700/261 |
| 2011/0010011 A1* | 1/2011 | Oka et al. | 700/258 |
| 2011/0071680 A1* | 3/2011 | Davis et al. | 700/261 |
| 2011/0166706 A1* | 7/2011 | Prisco et al. | 700/254 |
| 2011/0257787 A1* | 10/2011 | Sato et al. | 700/258 |

FOREIGN PATENT DOCUMENTS

JP             4-98304         3/1992

* cited by examiner

*Primary Examiner* — Jerrah Edwards
*Assistant Examiner* — Tamara Weber
(74) *Attorney, Agent, or Firm* — Oblon, McClelland, Maier & Neustadt, L.L.P.

(57) ABSTRACT

A CPU of a robot control device calculates load torque based on the inertia force, centrifugal force or Coriolis force, gravity force, friction torque, and actuator inertia torque applied to a joint axis of each link, each time an orientation parameter indicative of the link position and orientation allowed by a redundant degree of freedom is sequentially changed, under a constraint of end-effector position and orientation as target values. The CPU obtains the link position and orientation at which the ratio of the load torque to the rated torque of a rotary actuator provided for each joint is minimized, while the orientation parameter is being changed, and provides a feed-forward value that gives rise to each load torque obtained when the ratio of the load torque to the rated torque of the rotary actuator is minimized, to a control command generated to the rotary actuator of each joint axis for achieving the end-effector position and orientation as target values.

8 Claims, 5 Drawing Sheets

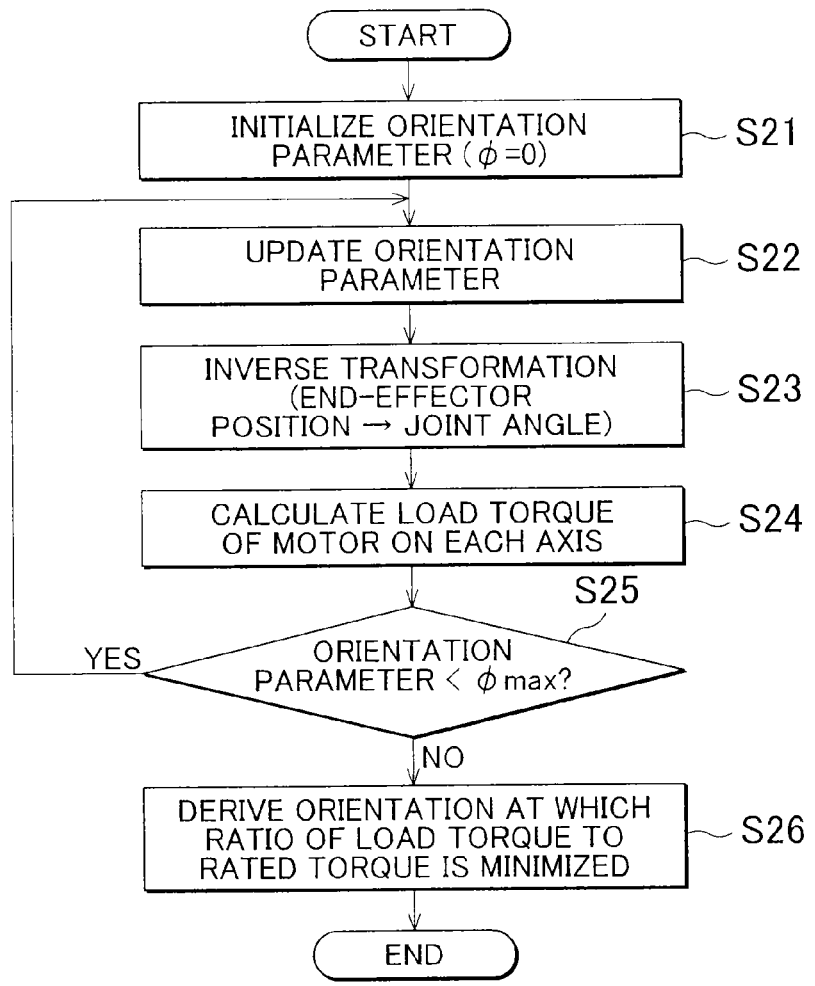
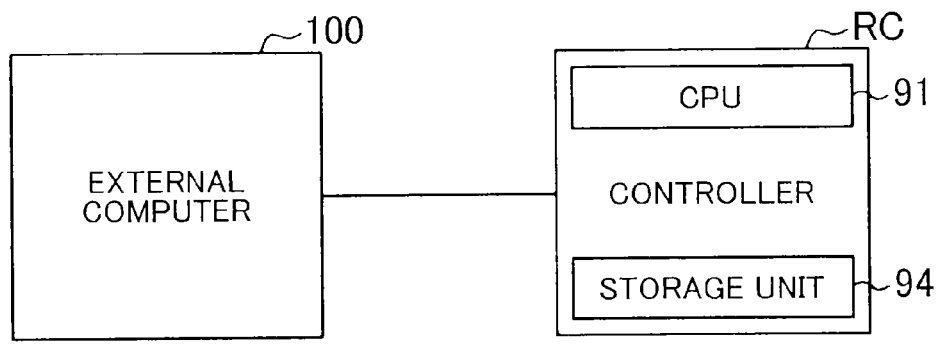

ROBOT CONTROL METHOD, ROBOT CONTROL DEVICE, AND ROBOT CONTROL SYSTEM

INCORPORATION BY REFERENCE

The disclosure of Japanese Patent Application No. 2012-059137 filed on Mar. 15, 2012 including the specification, drawings and abstract is incorporated herein by reference in its entirety.

BACKGROUND OF THE INVENTION

1. Field of the Invention

The invention relates to a robot control method, a robot control device, and a robot control system, and in particular to a robot control method, robot control device, and a robot control system for controlling a robot having at least one redundant degree of freedom that is redundant with respect to task degrees of freedom.

2. Description of Related Art

A computed torque controller for a robot arm as disclosed in Japanese Patent Application Publication No. 4-98304 (JP 4-98304 A) is known. The controller described in JP 4-98304 A calculates the inertia force, Coriolis force, centripetal force, and gravity force in real time, by correcting a target angular acceleration, using a state feedback value derived from a deviation of an output value of an angle at each given sampling period from a target value of the angle, and a deviation of an angular velocity from its target value, according to a motion of the robot arm, and controls the motion of the robot arm by causing a joint driving actuator to generate torque equivalent to the above-indicated forces.

By calculating the above-indicated inertia force and others in real time and giving torque to a motor for rotating or driving the robot arm as described above, the controllability can be improved.

If the inertia force and others are calculated in real time, and equivalent torque is given to a motor for rotating or driving a robot arm, in a robot having a redundant degree or degrees of freedom which is/are redundant with respect to task degrees of freedom, excessively large torque may have to be generated, depending on the posture or orientation of the robot. In this case, the controllability may deteriorate.

SUMMARY OF THE INVENTION

The invention provides a robot control method, robot control device, and a robot control system, which make it possible to improve the controllability by utilizing a redundant degree(s) of freedom, in a robot having the redundant degree(s) of freedom that is/are redundant with respect to task degrees of freedom, and reduce the torque capacity of each rotary actuator to the minimum necessary, so that the size of the rotary actuator can be reduced, and, consequently, the size of the robot can be reduced.

According to a first aspect of the invention, a method of controlling a robot having a manipulator formed by coupling a plurality of links at respective joint axes and having at least one redundant degree of freedom that is redundant with respect to task degrees of freedom is provided, in which each of the joint axes is driven by a rotary actuator provided for each joint of the manipulator. The robot control method includes the steps of: calculating load torque based on at least inertia force, centrifugal force or Coriolis force, and gravity force of the joint axis of each link, when link position and orientation allowed by the redundant degree of freedom is changed, under a constraint of end-effector position and orientation set as target values, obtaining the link position and orientation at which the ratio of the load torque to rated torque of the rotary actuator is minimized, while the link position and orientation are being changed, and providing a feed-forward value that gives rise to each load torque obtained when the ratio of the load torque to the rated torque of the rotary actuator is minimized, to a control command generated to the rotary actuator of each joint axis for achieving the end-effector position and orientation as target values.

According to a second aspect of the invention, a method of controlling a robot having a manipulator formed by coupling a plurality of links at respective joint axes and having at least one redundant degree of freedom that is redundant with respect to task degrees of freedom is provided, in which each of the joint axes is driven by a rotary actuator provided for each joint of the manipulator. The robot control method includes the steps of: calculating load torque based on at least inertia force, centrifugal force or Coriolis force, and gravity force of the joint axis of each link, each time an orientation parameter indicative of link position and orientation allowed by the redundant degree of freedom is sequentially changed, under a constraint of end-effector position and orientation set as target values, obtaining the link position and orientation at which the ratio of the load torque to rated torque of the rotary actuator is minimized, while the orientation parameter is being changed, and providing a feed-forward value that gives rise to each load torque obtained when the ratio of the load torque to rated torque of the rotary actuator is minimized, to a control command generated to the rotary actuator of each joint axis for achieving the end-effector position and orientation as target values.

In the robot control method according to the first or second aspect of the invention, the load torque may include friction torque. According to a third aspect of the invention, a robot control device that controls a robot having a manipulator formed by coupling a plurality of links at respective joint axes and having at least one redundant degree of freedom that is redundant with respect to task degrees of freedom is provided, in which each of the joint axes is driven by a rotary actuator provided for each joint of the manipulator. The robot control device includes a load torque calculating unit that calculates load torque based on at least inertia force, centrifugal force or Coriolis force, and gravity force of the joint axis of each link, each time an orientation parameter indicative of link position and orientation allowed by the redundant degree of freedom is sequentially changed, under a constraint of end-effector position and orientation set as target values, a link orientation calculating unit that obtains the link position and orientation at which the ratio of the load torque to rated torque of the rotary actuator is minimized, while the orientation parameter is being changed, and a providing unit that provides a feed-forward value that gives rise to each load torque obtained when the ratio of the load torque to the rated torque of the rotary actuator is minimized, to a control command generated to the rotary actuator of each joint axis for achieving the end-effector position and orientation as target values.

In the robot control device according to the third aspect of the invention, the load torque calculating unit may calculate the load torque including friction torque in addition to the inertia force, centrifugal force or Coriolis force, and gravity force of the joint axis of each link.

According to a fourth aspect of the invention, a robot control system that controls a robot having a manipulator formed by coupling a plurality of links at respective joint axes and having at least one redundant degree of freedom that is redundant with respect to task degrees of freedom is provided, in which each of the joint axes is driven by a rotary actuator provided for each joint of the manipulator. The robot control system includes a load torque calculating unit that calculates load torque based on at least inertia force, centrifugal force or Coriolis force, and gravity force of the joint axis of each link, each time an orientation parameter indicative of link position and orientation allowed by the redundant degree of freedom is sequentially changed, under a constraint of end-effector position and orientation set as target values, a link orientation calculating unit that obtains the link position and orientation at which the ratio of the load torque to the rated torque of the rotary actuator is minimized, while the orientation parameter is being changed, and a providing unit that provides a feed-forward value that gives rise to each load torque obtained when the ratio of the load torque to rated torque of the rotary actuator is minimized, to a control command generated to the rotary actuator of each joint axis for achieving the end-effector position and orientation as target values.

According to the first to fourth aspects of the invention, the controllability of the robot having one or more redundant degree(s) of freedom that is/are redundant with respect to task degrees of freedom can be improved, utilizing the redundant degree(s) of freedom. Furthermore, the torque capacity of the rotary actuator provided for each joint of the robot can be reduced to the minimum necessary; therefore, the size of the rotary actuator is reduced, and, consequently, the size of the robot can be reduced.

When friction torque is included in the load torque, the accuracy in the controllability can be further enhanced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a control flowchart of the robot control device; and

FIG. 6 is a block diagram of a robot control system as another embodiment of the invention.

DETAILED DESCRIPTION OF EMBODIMENTS

In the following, a robot control device and a robot control method as embodiments of the invention, for controlling a robot having a redundant degree of freedom that is redundant with respect to task degrees of freedom, will be described with reference to FIG. 1 through FIG. 5. Initially, a manipulator of the embodiment having a redundant degree of freedom that is redundant with respect to task degrees of freedom will be described.

Figure 1:
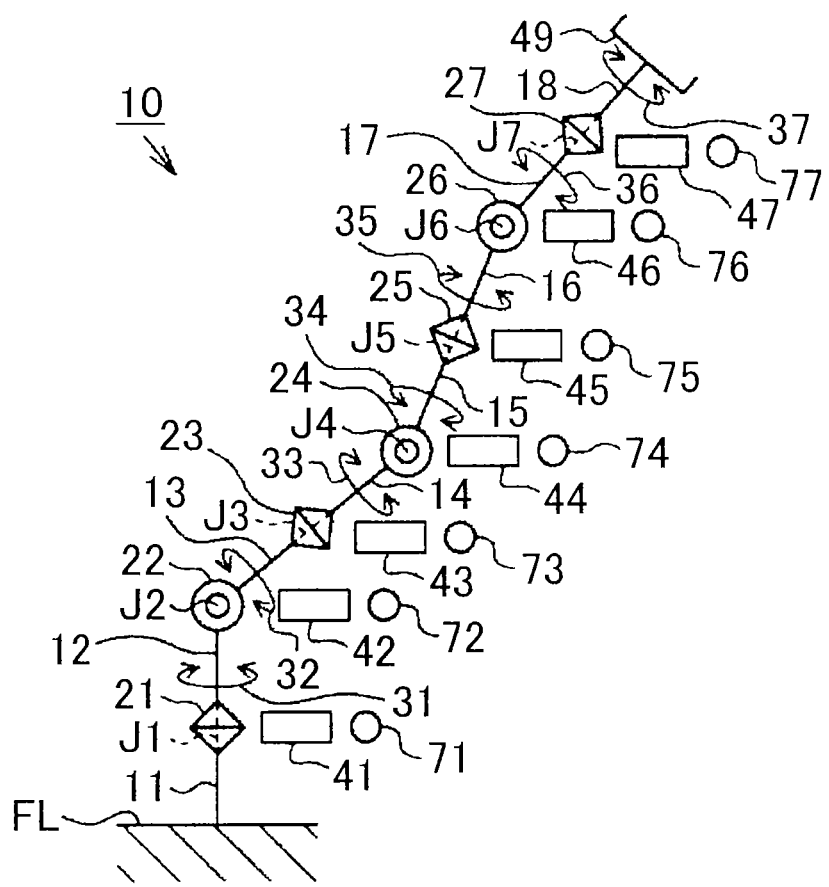
FIG. 1 is a skeleton diagram of a manipulator having redundancy according to one embodiment of the invention.

As shown in FIG. 1, the manipulator 10 is formed such that eight links 11-18 are coupled in series by seven joints 21-27. The manipulator 10 is a multi-joint robot having seven degrees of freedom (n (degree of freedom)=7), in which the links 12-18 can revolve at the seven joints 21-27, and the number of dimensions (m) of its task space is 6, which means that the manipulator has 1 (=n−m) redundancy. Namely, the manipulator 10 of this embodiment has one redundant degree of freedom, which is redundant with respect to six task degrees of freedom.

The first link 11 is fixed at its one end to a floor FL, and is connected at the other end to one side of the first joint 21. One end of the second link 12 is connected to the other side of the first joint 21, and one side of the second joint 22 is connected to the other end of the second link 12. Similarly, the third link 13, fourth link 14, fifth link 15, sixth link 16, seventh link 17 and the eighth link 18 are coupled in the order of description, via the third joint 23, fourth joint 24, fifth joint 25, sixth joint 26 and the seventh joint 27, respectively.

The other side of the first joint 21 can rotate relative to one side thereof, about an axis that extends in the vertical direction in FIG. 1, as indicated by arrow 31, so that the second link 12 can revolve in the direction of arrow 31 about a rotational axis (J1 axis) of the first joint 21, relative to the adjacent first link 11.

The other side of the second joint 22 can rotate about an axis (J2 axis) that extends in a direction perpendicular to the plane of paper in FIG. 1, as indicated by arrow 32. Thus, the third link 13 can rotate in the direction of arrow 32 about a rotational axis of the second joint 22, relative to the adjacent second link 12.

Similarly, the third joint 23, fourth joint 24, fifth joint 25, sixth joint 26 and the seventh joint 27 can rotate about their respective axes, and the fourth link 14, fifth link 15, sixth link 16, seventh link 17 and the eighth link 18 can also revolve in the directions of arrows 33-37, about rotational axes (J3 axis to J7 axis) of the joints 23-27, respectively. Throughout the whole specification, the links 11-18 coupled to each other via the first to seventh joints 21-27 will be referred to as "adjacent links 11-18". Each of the J1 axis to J7 axis corresponds to the above-indicated joint axis.

As shown in FIG. 1, a first servomotor 41 is mounted in the first joint 21. The first servomotor 41, when supplied with electric power, revolves the second link 12 relative to the first link 11, via a speed reducer (not shown).

A second servomotor 42 is mounted in the second joint 22. The second servomotor 42, when supplied with electric power, revolves the third link 13 relative to the second link 12, via a speed reducer (not shown). Similarly, servomotors 43-47 are mounted in the third joint 23, fourth joint 24, fifth joint 25, sixth joint 26 and the seventh joint 27, respectively. The servomotors 43-47, when supplied with electric power, revolve the corresponding links 14-18, via respective speed reducers (not shown).

Although each motor is provided in the corresponding joint, the motor is depicted in FIG. 1 as being separated from the corresponding joint, for convenience of explanation. While an AC motor as a servomotor is used as a rotary actuator in this embodiment, the rotary actuator of the invention is not limited to this type of motor.

A tool 49 is attached to a distal end of the eighth link 18. The tool 49 can revolve in the direction of arrow 37 as shown in FIG. 1, about the rotational axis (J7 axis) of the seventh joint 27, along with the eighth link 18. The tool 49 may be, for example, a hand capable of gripping a workpiece, or the like. It is, however, to be understood that the type of the tool 49 is not related with the invention, and therefore, the tool 49 is not limited to any particular type.

In the manipulator 10 as described above, the first servomotor 41 to the seventh servomotor 47 are driven so as to rotate the second link 12 to the eighth link 18, whereby the rotational angles of the second link 12 to the eighth link 18 are accumulated and act on the tool 49 located in a distal end portion of the manipulator 10. In this manner, the manipulator 10 can make the position and orientation of the distal end of the tool 49 coincide with target position and target orientation determined according to the content of its task.

Figure 2:
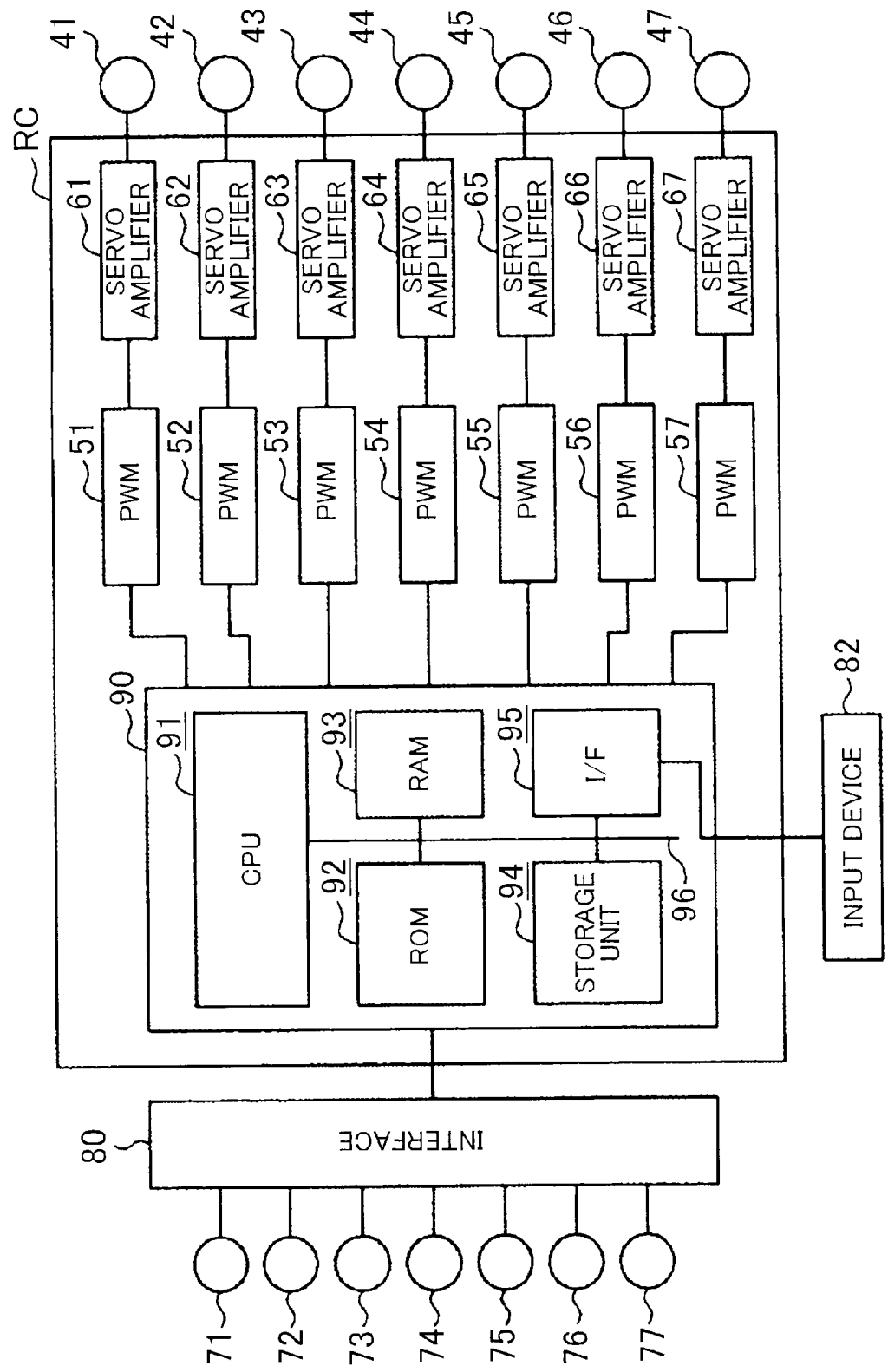
FIG. 2 is a schematic view of the configuration of a robot control device as one embodiment of the invention.

Referring next to FIG. 2, an electric configuration of the multi-joint robot, having, as a main component, a controller RC serving as a robot control device for controlling the manipulator 10, will be described. The controller RC has a computer 90, PWM generators 51-57 electrically connected to the computer 90, and servo amplifiers 61-67 electrically connected to the PWM generators 51-57. The servo amplifiers 61-67 are electrically connected to the first servomotor 41 to the seventh servomotor 47, respectively.

The computer 90 generates control commands to the PWM generators 51-57, and the PWM generators 51-57 generate PWM signals to the servo amplifiers 61-67 based on the control commands. The servo amplifiers 61-67 actuate the servomotors 41-47 according to the output PWM signals, so as to rotate the respective links 12-18.

Rotary encoders 71-77 are respectively incorporated in the servomotors 41-47, and are connected to the computer 90 via an interface 80. The rotary encoders 71-77 detect the angles of rotation of the respective servomotors 41-47, namely, detect the rotational angles (joint angles) of the links 12-18 relative to the adjacent links 11-17, and transmit the detection signals to the controller RC. The rotary encoders 71-77 correspond to rotational angle detectors. The rotational angle detector is not limited to the rotary encoder, but may be a resolver, or a potentiometer.

Instead of providing the first servomotor 41 to the seventh servomotor 47 with the rotary encoders 71-77, sensors capable of directly detecting the rotational angles (joint angles) of the links 11-18 may be mounted on the links 11-18 or the first joint 21 to the seventh joint 27.

The computer 90 includes CPU 91, ROM 92, RAM 93, a non-volatile storage unit 94, such as a hard disk, an interface 95, and so forth, which are electrically connected to each other via a bus 96.

Various types of data, task programs that cause the robot to perform various tasks, various parameters, etc. are stored in the storage unit 94. Namely, the robot of this embodiment is operable in a teaching play back method, and the manipulator 10 operates when any of the task programs is executed. The ROM 92 stores a system program for control of the system as a whole. The RAM 93 is a working memory for the CPU 91, and data is temporarily stored in the RAM 93 when the CPU 91 performs various computations, and the like. The CPU 91 corresponds to the above-indicated load torque calculating unit, link orientation calculating unit, and providing unit.

An input device 82 is connected to the controller RC via the interface 95. The input device 82 is an operator panel having a monitor screen, various input keys, etc. (not shown), which permits the user or operator to enter various types of data. The input device 82 is provided with a power on/off switch of the multi-joint robot, and enables the computer 90 to receive the final target position and final target orientation of the distal end (which will be called "end" or "end effector") of the tool 49 located in a distal end portion of the manipulator 10, and the position and orientation of the distal end of the tool 49 at each interpolation point. Also, the input device 92 permits entry through jogging operation, or the like, for changing the posture of the manipulator 10 utilizing the redundancy.

Figure 4:
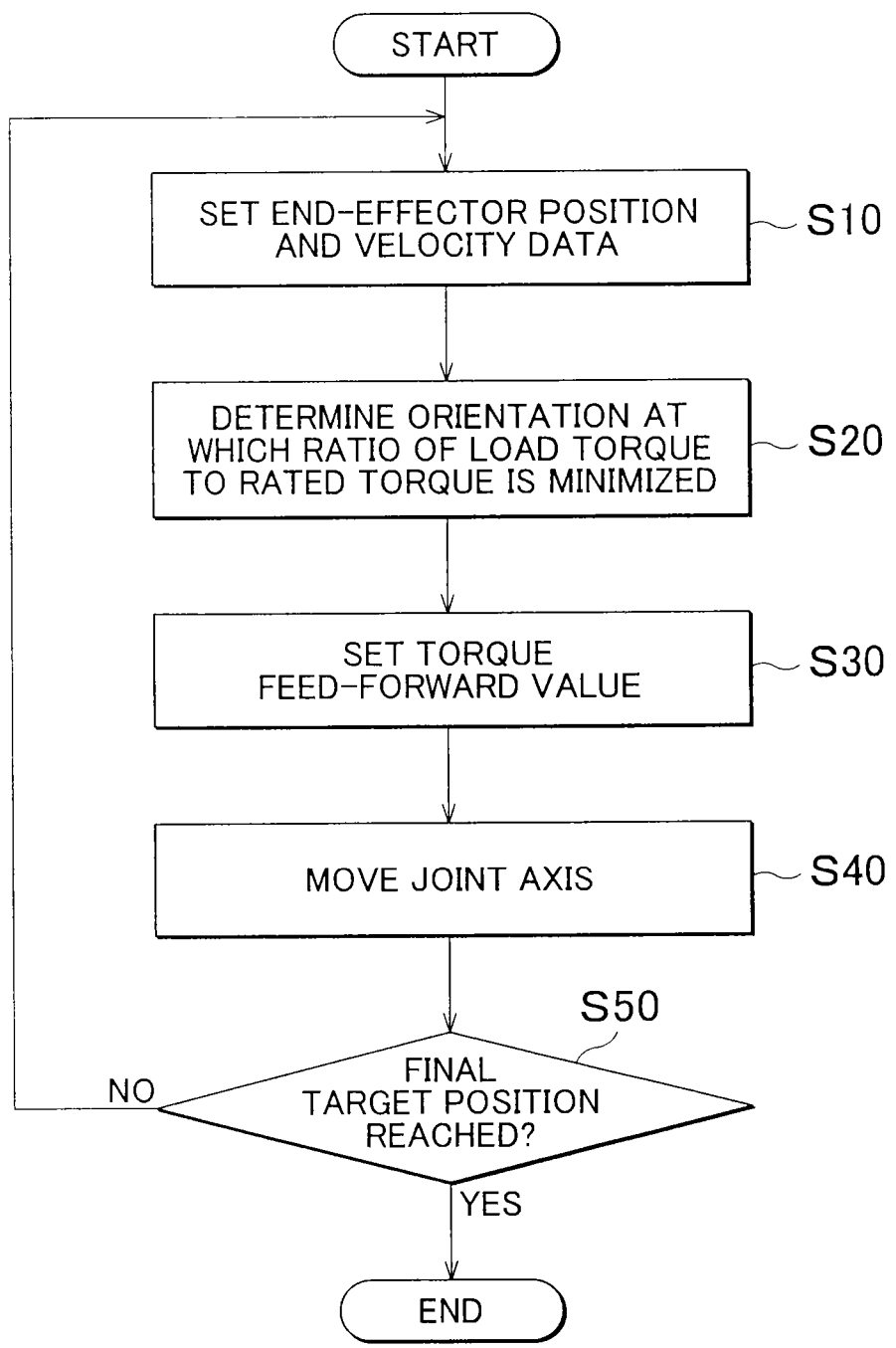
FIG. 4 is a control flowchart of the robot control device.

Next, the operation of the controller RC of the multi-joint robot according to this embodiment of the invention will be described. FIG. 4 and FIG. 5 are control flowcharts used when the end effector is located at taught points (the final target position, and positions of the distal end of the tool 49 at interpolation points) written in a task program executed by the CPU 91 of the controller RC. The rotary encoders 71-77 detect the rotational angles (or joint angles) in detection cycles that are sufficiently shorter than control cycles in which steps as described below are executed.

In step S10, the CPU 91 sets a taught point (end-effector position), end-effector orientation, and velocity data, which are written in a task program stored in the storage unit 94, in a specified region of the RAM 93. The end-effector position and end-effector orientation will be collectively called "end-effector position and orientation".

The CPU 91 then determines the orientation of the end effector located at the taught position (end-effector position) set in step S10, which provides the smallest ratio of load torque to rated torque. The operation of step S20 will be described in detail with reference to the flowchart of FIG. 5.

In step S21, the CPU 91 initialize an orientation parameter $\phi$. While the orientation parameter $\phi$ is set to 0 for initialization in this embodiment, the initial value is not limited to 0. The orientation parameter $\phi$ will be described below.

Figure 3:
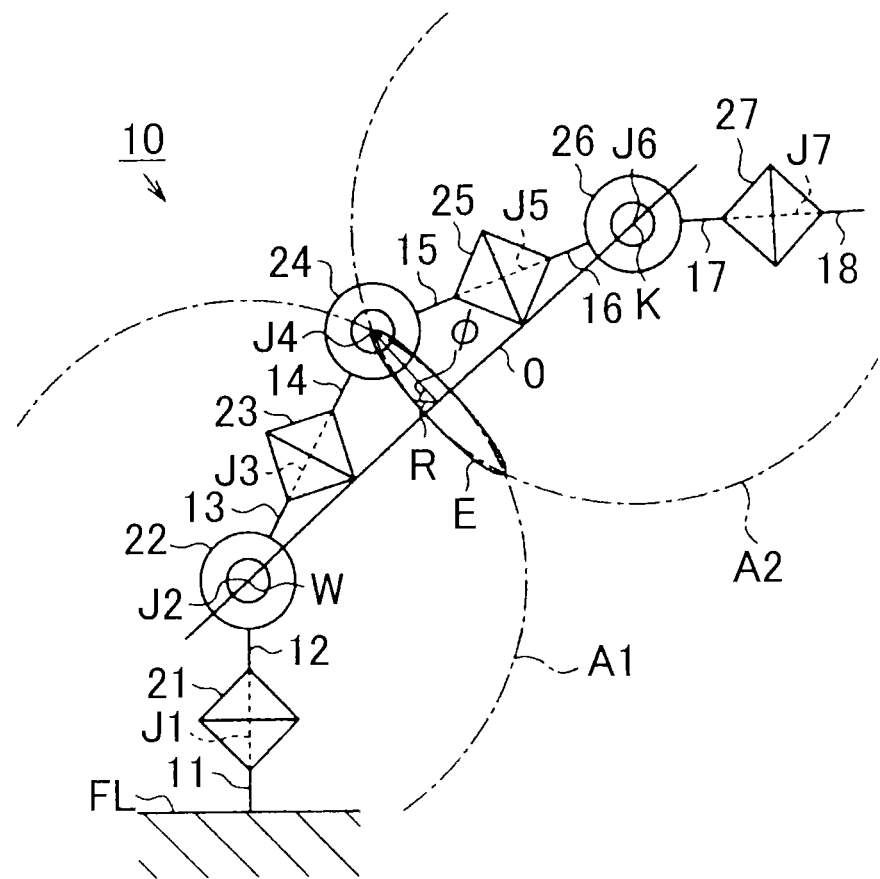
FIG. 3 is a view useful for explaining an orientation parameter.

The orientation parameter $\phi$ of the manipulator 10 having a redundant degree of freedom indicates the link position and orientation allowed by the redundant degree of freedom when the position of the end effector is fixed, namely, when the position and orientation of the end effector are constrained. More specifically, as shown in FIG. 3, the fourth joint 24 of the manipulator 10 is able to move on a crossed circle E formed by a sphere A1 having a center at the second joint 22 (which will be called "first reference point W") and a radius equal to a sum of link lengths of the third link 13 and the fourth link 14, and a sphere A2 having a center at the sixth joint 26 (which will be called "second reference point K") and a radius equal to a sum of link lengths of the fifth link 15 and the sixth link 16. Accordingly, in this embodiment, the link position and orientation changes so that the fourth joint 24 is located on the crossed circle E.

As shown in FIG. 3, a center axis O that passes the center of the crossed circle E is an axis that passes the first reference point W (the center of the second joint 22) and the second reference point K (the center of the sixth joint 26). Since the fourth joint 24 is located on the crossed circle E, the orientation parameter $\phi$ may represent the link position and orientation on the crossed circle E. Thus, an angle as measured from a given position R on the crossed circle E to a position to which the position of the fourth joint 24 is changed is defined as the orientation parameter $\phi$. In this embodiment, the position R is the current position of the fourth joint 24.

In step S22, the CPU 91 updates the orientation parameter $\phi$ by adding a predetermined value to the parameter $\phi$. Namely, the link position and orientation are supposed to be changed by virtually increasing the orientation parameter $\phi$.

In step S23, inverse transformation is performed so as to obtain the joint angles from the end-effector position and orientation. Where $q_1, q_2, q_3, \ldots, q_7$ denote the joint angles of the first joint 21 to the seventh joint 27, respectively, and (x, y, z) and (a, b, c) denote the end-effector coordinates and end-effector orientation, vector q and end-effector position and orientation X are represented as follows.

$$q = (q_1, q_2, \ldots, q_7)$$

$$X = (x, y, z, a, b, c) \quad (1)$$

Each joint angle $q_1, q_2, q_3, \ldots, q_7$ may be expressed as indicated in Eq. (2) below, and these equations (2) are inverse transformation equations. In step S23, each joint angle $q_1, q_2$, $q_3, \ldots, q_7$ is calculated according to Eq. (2), using the end-effector position and orientation X and the orientation parameter $\phi$.

$$q_1 = f_1(X, \phi)$$
$$q_2 = f_2(X, \phi)$$
$$\vdots$$
$$q_7 = f_7(X, \phi)$$
(2)

In step S24, the CPU 91 calculates the load torque of the motor provided on each joint axis, according to Eq. (3) below, and stores the calculated load torque in the storage unit 94.

On the right-hand side of Eq. (3), the first term is the inertia force, the second term is torque derived from the centrifugal force or the Coriolis force, the third term is torque derived from a gravity load, the fourth term is friction torque, and the fifth term is actuator inertia torque. In Eq. (3), the first to third terms are Lagrange equations of motion, which are known equations. The fourth and fifth terms on the right-hand side of Eq. (3) are terms taking account of influences of the actuator.

$$\tau = \frac{1}{u} \Bigg\{ \sum_{k=j}^{n} \sum_{j=1}^{k} tr\left(\frac{\partial^0 T_k}{\partial q_j} \hat{H}_k \frac{\partial^0 T_k^T}{\partial q_i}\right) \ddot{q}_j + \sum_{k=j}^{n} \sum_{j=1}^{k} \sum_{m=1}^{k} tr\left(\frac{\partial^{20} T_k}{\partial q_j \partial q_m} \hat{H}_k \frac{\partial^0 T_k^T}{\partial q_i}\right) \dot{q}_j \dot{q}_m - \sum_{j=i}^{n} m_j g^T \frac{\partial^0 T_j}{\partial q_j} {}^j \hat{s}_j \Bigg\} + (\gamma_{q,i} + \gamma_{C,i} \cdot \dot{q}_i) + I_i \ddot{q}_i$$
(3)

In Eq. (3) above, $q_i$ is the angle of joint i, $\dot{q}_i$ is the angular velocity of joint i, $\ddot{q}_i$ is the angular acceleration of joint i, n is the number of links, k is link k (k=1–7), T is a transposed matrix, tr is trace (diagonal sum), and u is the reduction ratio of the speed reducer (known). The angular velocity and angular acceleration of joint i are calculated based on the obtained joint angle $q_i$, and the velocity data set in step S10.

The inertia force of the first term will be described in more detail.

(About the First Term)

$$\frac{\partial^0 T_k}{\partial q_j}:$$

the homogeneous transformation matrix ${}^0T_k$ from the world coordinates $\Sigma_0$ to the k axis is partially differentiated with respect to $q_j$.

The partial differential of the homogeneous transformation matrix can be developed as follows.

$$\frac{\partial^0 T_k}{\partial q_j} = {}^0T_1 {}^1T_2 \ldots {}^{j-2}T_{j-1} \frac{\partial^{j-1} T_j}{\partial q_j} {}^jT_{j+1} \ldots {}^{k-1}T_k$$

Also, in the case of a rotary actuator, such as a motor, $$\frac{\partial^{j-1} T_j}{\partial q_j} = {}^{j-1}T_j \bullet \Delta$$

where, $$\Delta = \begin{pmatrix} 0 & -1 & 0 & 0 \\ 1 & 0 & 0 & 0 \\ 0 & 0 & 0 & 0 \\ 0 & 0 & 0 & 0 \end{pmatrix},$$

and the partial differential of the homogeneous transformation matrix can be represented by the product of the homogeneous transformation matrix and $\Delta$.

$\hat{H}_k$: pseudo inertia matrix

The pseudo inertia matrix (4×4) is obtained from the inertia matrix, and is thus expressed as follows, in view of characteristics of links.

$$\hat{H}_k = \begin{pmatrix} \frac{-\hat{I}_{ixx} + \hat{I}_{iyy} + \hat{I}_{izz}}{2} & \hat{H}_{ixy} & \hat{H}_{ixz} & m_i \hat{s}_{ix} \\ \hat{H}_{ixy} & \frac{\hat{I}_{ixx} - \hat{I}_{iyy} + \hat{I}_{izz}}{2} & \hat{H}_{iyz} & m_i \hat{s}_{iy} \\ \hat{H}_{ixz} & \hat{H}_{iyz} & \frac{\hat{I}_{ixx} + \hat{I}_{iyy} - \hat{I}_{izz}}{2} & m_i \hat{s}_{iz} \\ m_i \hat{s}_{ix} & m_i \hat{s}_{iy} & m_i \hat{s}_{iz} & m_i \end{pmatrix}$$

Here, the position of the mass center of link i, as viewed from the link coordinate system $\Sigma i$, is ${}^i\hat{s}_i = [s_{ix}, s_{iy}, s_{iz}, 1]^T$.

In this connection, $\hat{s}_{ix} = \int_{ink\ i} {}^i r_x dm/m_i$ x coordinate of the coordinate system $\Sigma i$ of the mass center position of link i $\hat{s}_{iy} = \int_{ink\ i} {}^i r_y dm/m_i$ y coordinate of the coordinate system $\Sigma i$ of the mass center position of link i $\hat{s}_{iz} = \int_{ink\ i} {}^i r_z dm/m_i$ z coordinate of the coordinate system $\Sigma i$ of the mass center position of link i where $m_i$ is the mass of link i, and dm is the infinitesimal mass of a certain point r on link i.

The position of a certain point of link i is represented as ${}^i r_i = [{}^i r_x, {}^i r_y, {}^i r_z]^T$.

$\hat{I}_{ixx} = \int_{inki}({}^i r_y{}^2 + {}^i r_z{}^2)dm$: the moment of inertia $\hat{H}_{ixy} = \int_{inki} {}^i r_x {}^i r_y{}^2 dm$: the product of inertia In this connection, $\hat{I}_{iyy}, \hat{I}_{izz}, \hat{H}_{ixz}, \hat{H}_{iyz}$ are expressed similarly.

(About the Second Term)

$j \leq m \leq k$ (About the Third Term)

$g = [g_x, g_y, g_z, 0]^T$: gravity acceleration vectors on the world coordinate system (reference coordinate system) $\Sigma_0$.

(About the Fourth Term)

$\gamma_q$: coulomb friction (known)

$\gamma_c$: viscosity friction (known)

(About the Fifth Term)

$I_i$ in the fifth term: the moment of inertia of the output shaft of the motor which also serves as the input shaft of the speed reducer The parameters, etc. indicated as "known" are stored in the storage unit 94.

If the calculation of the load torque of the motor provided on each joint axis is completed, the CPU 91 proceeds to step S25. In step S25, the CPU 91 returns to step S22 if the orientation parameter $\phi$ is smaller than a preset upper limit $\phi$max. If the orientation parameter $\phi$ is equal to or larger than the preset upper limit $\phi$max, the CPU 91 proceeds to step S26. The upper limit $\phi$max is set in advance by tests, or the like.

In step S26, the CPU 91 calculates the ratio (load torque/ rated torque) of each load torque calculated in step S24, to the rated torque of the motor of each joint axis, which is stored in advance in the storage unit 94, and derives an orientation parameter φ from which the load torque that provides the smallest ratio was calculated.

Reference is now made back to the flowchart of FIG. 4. In step S30, the CPU 91 calculates a torque feed-forward value that gives rise to the load torque that results in the smallest ratio, at the orientation parameter φ from which the load torque that provides the smallest ratio was calculated, namely, a motor current value for producing the above-described load torque, by a known method.

In step S40, the CPU 91 provides the calculated torque feed-forward value, to a control command generated to the rotary actuator of each joint axis for achieving the end-effector position and orientation set in step S10 as target values, and generates the control command provided with the torque feed-forward value, to each of the PWM generators 51-57, as a command of the current control cycle. The PWM generators 51-57 generate PMW signals based on the control commands, to the servo amplifiers 61-67. The servo amplifiers 61-67 actuate or operate the first servomotor 41 to the seventh servomotor 47 of the respective joint axes according to the outputs signals of the PWM generators 51-57, thereby to rotate the respective links 12-18.

The CPU 91 determines in step S50 whether the end effector has reached the final target position and the final target orientation (namely, the final target position and orientation), based on the detection signals from the respective rotary encoders 71-77. The CPU 91 returns to step S10 if it determines that the end effector has not reached the final target position and orientation, and finishes this flowchart if it determines that the end effector has reached the final target position and orientation of the task program. The CPU 91, when it returns to step S10, sets the next end-effector position and orientation and velocity data described in the task program.

This embodiment has the following features. (1) The control method of this embodiment is a method of controlling a robot having the manipulator 10 including a plurality of links, i.e., the first link 11 to the eighth link 18, coupled at respective joint axes (J1 axis to J7 axis) and having one redundant degree of freedom that is redundant with respect to task degrees of freedom, wherein the joint axes are driven by the first servomotor 41 to the seventh servomotor 47 (rotary actuators) provided for each joint. According to the control method, load torque based on the inertia force, centrifugal force or Coriolis force, gravity force, friction torque and actuator inertia torque applied to the joint axis of each link, is calculated, when the link position and orientation allowed by the redundant degree of freedom is changed, under a constraint of the end-effector position and orientation set as target values. Then, the link position and orientation at which the ratio of the load torque to the rated torque of the first servomotor 41 to the seventh servomotor 47 is minimized, is obtained while the link position and orientation are changed. Then, a feed-forward value that gives rise to each load torque obtained when the ratio of the load torque to the rated torque of the first servomotor 41—the seventh servomotor 47 is minimized is provided or added to a control command generated to the first servomotor 41—the seventh servomotor 47 of each joint axis for achieving the end-effector position and orientation as target values. Thus, according to the control method of this embodiment, the controllability can be improved, utilizing the redundant degree of freedom, and the torque capacities of the first servomotor 41 to the seventh servomotor 47 can be reduced to the minimum necessary; therefore, the first servomotor 41 to the seventh servomotor 47 can be reduced in size, thus achieving reduction of the size of the robot.

(2) In the control method of this embodiment, load torque based on the inertia force, centrifugal force or Coriolis force, gravity force, friction torque and actuator inertia torque applied to the joint axis of each link is calculated, each time the orientation parameter φ indicative of the link position and orientation allowed by the redundant degree of freedom is sequentially changed, under a constraint of the end-effector position and orientation as target values. Then, the link position and orientation at which the ratio of the load torque to the rated torque of the first servomotor 41—the seventh servomotor 47 (rotary actuator) is minimized is obtained while the orientation parameter φ is being changed. Then, a feed-forward value that gives rise to each load torque obtained when the ratio of the load torque to the rated torque of the first servomotor 41—the seventh servomotor 47 is minimized is provided or added to a control command generated to the first servomotor 41—the seventh servomotor 47 of each joint axis for achieving the end-effector position and orientation as target values. Consequently, effects similar to those as described above in (1) are yielded.

(3) The control method of this embodiment is characterized in that the load torque includes the friction torque. Thus, according to the control method of this embodiment in which the friction torque is included in the load torque, the accuracy in the controllability can be further enhanced.

(4) The robot control device of this embodiment includes the CPU 91 (load torque calculating unit) that calculates load torque based on the inertia force, centrifugal force or Coriolis force, gravity force, friction torque and actuator inertia torque applied to the joint axis of each link, each time the orientation parameter φ indicative of the link position and orientation allowed by the redundant degree of freedom is sequentially changed, under a constraint of the end-effector position and orientation set as target values. Also, the CPU 92 functions as a link orientation calculating unit that obtains the link position and orientation at which the ratio of the load torque to the rated torque of the first servomotor 41—the seventh servomotor 47 (rotary actuator) is minimized, while the orientation parameter φ is being changed.

Further, the CPU 91 functions as a providing unit that provides or adds a feed-forward value that gives rise to each load torque obtained when the ratio of the load torque to the rated torque of the first servomotor 41—the seventh servomotor 47 is minimized, to a control command generated to the first servomotor 41—the seventh servomotor 47 of each joint axis for achieving the end-effector position and orientation as target values. Consequently, according to this embodiment, the controllability can be improved, utilizing the redundant degree of freedom, and the torque capacities of the first servomotor 41 to the seventh servomotor 47 can be reduced to the minimum necessary; therefore, the resulting robot control device achieves reduction in the size of the first servomotor 41 to the seventh servomotor 47, and consequently, reduction in the size of the robot.

(5) The CPU 91 (load torque calculating unit) of the robot control device of this embodiment calculates load torque including friction torque, as well as the inertia torque, centrifugal force or Coriolis force, and gravity force of the joint axis of each link. Thus, according to the robot control device of this embodiment in which friction torque is included in the load torque, the accuracy in the controllability can be further enhanced.

The present invention is not limited to the illustrated embodiment, but the embodiment may be changed or modified as follows. In the illustrated embodiment, in the process of steps S10-S50 and the process of steps S21-S26, the derivation of the orientation at which the ratio of the load torque to the rated torque is minimized is performed in real time during execution of a task program. However, this control method may be replaced by a robot control system as one embodiment of the invention.

More specifically, as shown in FIG. 6, a computer 100 (e.g., a computer at a higher level than the controller RC) connected to the controller RC for communication therewith executes a task program created by a teaching play back method, by simulation, so that the computer 100 functions as a load torque calculating unit, and calculates load torque based on at least the inertia force, centrifugal force or Coriolis force, and gravity force of the joint axis of each link, each time an orientation parameter indicative of the link position and orientation allowed by the redundant degree of freedom is sequentially changed, under a constraint of the end-effector position and orientation as target values described in a step of the task program. As in the illustrated embodiment, the load torque may further include at least one of the friction torque and the actuator inertia torque. Then, the computer 100 obtains the link position and orientation at which the ratio of the load torque to the rated torque of the rotary actuator is minimized, while the orientation parameter $\phi$ is being changed. While only the CPU 91 and the storage unit 94 are illustrated in the controller RC of FIG. 6, for convenience of explanation, the controller RC of FIG. 6 has the same configuration as that of the illustrated embodiment.

The link position and orientation at which the ratio of the obtained load torque to the rated torque of the first servomotor 41—the seventh servomotor 47 are transmitted from the external computer 100 to the controller RC, and stored in the storage unit 94 in association with each of a plurality of steps described in the task program. In this connection, taught points, taught orientations, and velocity data are described in the plurality of steps described in the task program.

Then, the CPU 91 of the controller RCV functions as a providing unit as in the illustrated embodiment, when the task program is executed. Namely, the CPU 91 provides or adds a feed-forward value that gives rise to each load torque obtained when the ratio of the load torque stored in the storage unit 94 to the rated torque of the first servomotor 41—the seventh servomotor 47 (rotary actuator) is minimized, to a control command generated to the first servomotor 41—the seventh servomotor 47 (rotary actuator) of each joint axis for achieving the end-effector position and orientation as target values.

In this manner, too, substantially the same effects as those provided in the illustrated embodiment can be yielded. While an AC motor as a servomotor is used as the actuator in the illustrated embodiment, a DC motor, stepping motor, or the like, may also be used as the actuator.

While the friction torque of the fourth term and the actuator inertia torque of the fifth term are added to the load torque in Eq. (3) in the illustrated embodiment, one of the friction torque and the actuator inertia torque, or both of them, may not be added to the load torque. In this case, the controllability may somewhat deteriorate, as compared with that of the illustrated embodiment, but may be improved as compared with that of the related art.

While the robot (or manipulator) has one redundant degree of freedom in the illustrated embodiment, the invention may be applied to robot control device and control method for controlling a robot having two or more redundant degrees of freedom.

What is claimed is:

1. A method of controlling a robot having a manipulator formed by coupling a plurality of links at respective joint axes and having at least one redundant degree of freedom that is redundant with respect to task degrees of freedom, each of the joint axes being driven by a rotary actuator provided for each joint of the manipulator, comprising:

calculating load torque of a respective rotary actuator on the joint axis of each link based on at least inertia force, centrifugal force or Coriolis force, and gravity force, each time a link position and orientation allowed by the redundant degree of freedom is changed, by a predetermined value, from an initial link position and orientation to a final link position and orientation, under a constraint of end-effector position and orientation set as target values;

obtaining the link position and orientation at which the ratio of the load torque to rated torque of each of the rotary actuators is minimized, while the link position and orientation are being changed from the initial link position and orientation to the final link position and orientation; and providing a feed-forward value that gives rise to each load torque obtained when the ratio of the load torque to the rated torque of each of the rotary actuators is minimized, to a control command generated to the rotary actuator of each joint axis for achieving the end-effector position and orientation as target values.

2. The method according to claim 1, wherein the load torque includes friction torque.

3. A method of controlling a robot having a manipulator formed by coupling a plurality of links at respective joint axes and having at least one redundant degree of freedom that is redundant with respect to task degrees of freedom, each of the joint axes being driven by a rotary actuator provided for each joint of the manipulator, comprising:

calculating load torque of a respective rotary actuator on the joint axis of each link based on at least inertia force, centrifugal force or Coriolis force, and gravity force, each time an orientation parameter indicative of link position and orientation allowed by the redundant degree of freedom is sequentially changed, by a predetermined value, from an initial link position and orientation to a final link position and orientation, under a constraint of end-effector position and orientation set as target values;

obtaining the link position and orientation at which the ratio of the load torque to rated torque of each of the rotary actuators is minimized, while the orientation parameter is being changed from the initial link position and orientation to the final link position and orientation; and providing a feed-forward value that gives rise to each load torque obtained when the ratio of the load torque to the rated torque of each of the rotary actuators is minimized, to a control command generated to the rotary actuator of each joint axis for achieving the end-effector position and orientation as target values.

4. The method according to claim 3, wherein the load torque includes friction torque.

5. A robot control device that controls a robot having a manipulator formed by coupling a plurality of links at respective joint axes and having at least one redundant degree of freedom that is redundant with respect to task degrees of freedom, each of the joint axes being driven by a rotary actuator provided for each joint of the manipulator, comprising:

a load torque calculating unit that calculates load torque of a respective rotary actuator on the joint axis of each link based on at least inertia force, centrifugal force or Coriolis force, and gravity force, each time an orientation parameter indicative of link position and orientation allowed by the redundant degree of freedom is sequentially changed, by a predetermined value, from an initial link position and orientation to a final link position and orientation, under a constraint of end-effector position and orientation set as target values;

a link orientation calculating unit that obtains the link position and orientation at which the ratio of the load torque to rated torque of each of the rotary actuators is minimized, while the orientation parameter is being changed from the initial link position and orientation to the final link position and orientation; and a providing unit that provides a feed-forward value that gives rise to each load torque obtained when the ratio of the load torque to the rated torque of each of the rotary actuators is minimized, to a control command generated to the rotary actuator of each joint axis for achieving the end-effector position and orientation as target values.

6. The robot control device according to claim 5, wherein the load torque calculating unit calculates the load torque including friction torque in addition to the inertia force, centrifugal force or Coriolis force, and gravity force of the joint axis of each link.

7. A robot control system that controls a robot having a manipulator formed by coupling a plurality of links at respective joint axes and having at least one redundant degree of freedom that is redundant with respect to task degrees of freedom, each of the joint axes being driven by a rotary actuator provided for each joint of the manipulator, comprising:

a load torque calculating unit that calculates load torque of a respective rotary actuator on the joint axis of each link based on at least inertia force, centrifugal force or Coriolis force, and gravity force, each time an orientation parameter indicative of link position and orientation allowed by the redundant degree of freedom is sequentially changed, by a predetermined value, from an initial link position and orientation to a final link position and orientation, under a constraint of end-effector position and orientation set as target values;

a link orientation calculating unit that obtains the link position and orientation at which the ratio of the load torque to rated torque of each of the rotary actuators is minimized, while the orientation parameter is being changed from the initial link position and orientation to the final link position and orientation; and a providing unit that provides a feed-forward value that gives rise to each load torque obtained when the ratio of the load torque to the rated torque of each of the rotary actuators is minimized, to a control command generated to the rotary actuator of each joint axis for achieving the end-effector position and orientation as target values.

8. The robot control system according to claim 7, wherein the load torque calculating unit calculates the load torque including friction torque in addition to the inertia force, centrifugal force or Coriolis force, and gravity force of the joint axis of each link.

* * * * *